United States Patent [19]

Sullivan

[11] Patent Number: 5,378,486
[45] Date of Patent: * Jan. 3, 1995

[54] SHORTBREAD HAVING A PERCEPTIBLE COOLING SENSATION

[75] Inventor: Joanne Sullivan, Wyckoff, N.J.

[73] Assignee: Nabisco, Inc., Parsippany, N.J.

[ * ] Notice: The portion of the term of this patent subsequent to Nov. 2, 2010 has been disclaimed.

[21] Appl. No.: 985,070

[22] Filed: Dec. 3, 1992

[51] Int. Cl.$^6$ ............................................. A23L 1/10
[52] U.S. Cl. .................................. 426/549; 426/601; 426/804
[58] Field of Search ......................... 426/549, 804, 601

[56] References Cited

U.S. PATENT DOCUMENTS

| | | |
|---|---|---|
| 4,834,991 | 5/1989 | Porcello et al. . |
| 4,865,859 | 9/1989 | Porcello et al. . |
| 5,017,400 | 5/1991 | Olinger et al. . |
| 5,108,769 | 4/1992 | Kincs . |

OTHER PUBLICATIONS

Larousse Gastronomique by P. Montagne 1961 Crown Publishers Inc 1961 p. 877.

Bonanome, A. and Grundy, S. M., New Eng. Jour. Med. 318: 1244–1248 (1988).
Leach, H. W., The Bakers Digest, Jun., 1968, 36–38.
Mensink, R. P. and Katan, M. B., New Eng. Jour. Med., 323: 439–445 (1990).

*Primary Examiner*—Carolyn Paden

[57] ABSTRACT

Shortbread having a refreshing cooling sensation upon eating contain confectioners' sugar and fats bearing long, saturated $C_{16}$ to $C_{22}$ fatty acid residues and a mixture of short $C_2$ to $C_4$ acid residues, a portion of which are propionic acid residues. One preferred embodiment contains fats bearing acetic and propionic acid residues and residues of fatty acids derived from fully hydrogenated oils containing at least about 75% stearic acid such as hydrogenated soybean oil or hydrogenated canola. Another preferred embodiment contains fats bearing a mixture of acetic, propionic and butyric and the same complement of long acids. These fats are low in calories, low in myristic and palmitic acid and trans unsaturated acid residues, and low in cholesterol. The cooling sensation imparted to the shortbread of this invention is achieved without adding other cooling-imparting ingredients such as dextrose, mint oils, or polyols, and can mask the burning sensation of artificial sweeteners and other ingredients.

20 Claims, No Drawings

SHORTBREAD HAVING A PERCEPTIBLE COOLING SENSATION

TECHNICAL FIELD

This invention relates to shortbread cookie compositions and processes for their preparation.

A refreshing cooling sensation on consumption is desired for the improvement and enhancement of the mouth feel and palatability of many bakery and confectionery products. Cooling sensations can enhance the pleasant "quick get away" characteristics perceived when a bite of food dissolves, melts, changes from a solid to a liquid or disappears quickly or rapidly in the mouth, without a waxy or oily aftertaste. In addition, some food ingredients, for example, sugar substitutes such as xylitol in sugar-free food products for weight control, tooth decay suppression, and diabetic diets, can produce a burning after-taste that cooling-imparting ingredients or other special formulations can help mask (see, for example, U.S. Pat. No. 5,017,400 to Olinger and Krueger).

It would be desirable to impart perceptible cooling sensations to certain food products.

BACKGROUND ART

A cooling sensation is generally imparted to foodstuffs by the addition of certain ingredients such as dextrose, polyols, or mint oils, e.g., peppermint, spearmint, or wintergreen, to the products. For example, in amounts above about 5 percent, dextrose tends to impart a cooling sensation to filler creams (U.S. Pat. Nos. 4,834,991 to Porcello, et al., and 4,865,859 to Porcello and Manns). In fondants, dextrose affects crystal structure and growth (Leach, H. W., *The Bakers Digest*, June 1968: 36–38). Polyols, notably glycerol and propylene glycol, appear to assist in aligning fat crystals in the fat component of coating compositions, creating an elevated apparent melting temperature in food products incorporating the additive (U.S. Pat. No. 5,108,769 to Kincs).

Imparting a cooling sensation is but one goal in the formulation of certain food products. Other goals include calorie reduction and fat reduction or the minimization of certain fat components. Dietary fat is the most concentrated source of energy of all the nutrients, supplying 9 kcal/gram, about double that contributed by carbohydrate. Not only are fats high in calories, but certain fats may pose a health risk when consumed over time. For example, triglycerides bearing significant amounts lauric, myristic, and palmitic acid residues have been shown to increase plasma cholesterol concentrations (Bonanome, A., and Grundy, S. M., *New Eng. Jour. Med.* 318: 1244–1248 (1988)), as does cholesterol consumption. Triglycerides bearing significant amounts of trans-unsaturated fatty acid residues such as partially hydrogenated vegetable oils have been recently shown to raise low density lipoprotein serum cholesterol levels and to lower high density lipoprotein serum cholesterol levels in adults fed fats having these acids (Mensink, R. P., and Katan, M. B., *New Eng. Jour. Med.*, 323: 439–445 (1990)). Hence, a goal of recent research in the food industry has been to decrease caloric intake from fats, and to minimize or eliminate partially hydrogenated fats and fats containing lauric, myristic, and palmitic acid in food products.

Shortbread, a thick cookie traditionally made of flour, sugar and a large amount of butter or other shortening, is ordinarily high in calories because of its fat component. In addition, butter, commonly used in shortbread, contains significant amounts of myristic and palmitic acid, as well as cholesterol, and substitute, equally calorific vegetable shortenings are generally partially hydrogenated so they contain significant levels of trans-unsaturation.

It would be desirable to have low calorie shortbread that contains little or no trans unsaturated fats, and decreased amounts of butter. It would also be desirable to have, without the use of additives, shortbread having a pleasant cooling sensation upon eating.

DISCLOSURE OF THE INVENTION

An object of the present invention is to provide shortbread that has a pleasant, cooling sensation when eaten.

It is another object of the invention to provide shortbread that is low in calories, low in myristic and palmitic acid and cholesterol, and low in or free of trans unsaturation.

These and other objects are accomplished by the present invention, which provides shortbread cookie compositions comprising confectioner's sugar and triglycerides bearing long $C_{16}$ to $C_{22}$ saturated fatty acid residues and a mixture of $C_2$ to $C_4$ short acid residues, a portion of which are propionic acid residues. In preferred embodiments, the shortbread fat component contains triglycerides bearing long, saturated fatty acid residues derived from hydrogenated oils having at least about 75% stearic acid residues, such as, for example, hydrogenated canola or hydrogenated soybean oil, and short acid residues derived from a mixture of acetic and propionic acids, a mixture of propionic and butyric, or a mixture of acetic, propionic, and butyric acid.

Methods for imparting, upon consumption, a perceptible cooling sensation to shortbread cookies are also disclosed.

GENERAL DESCRIPTION OF THE INVENTION

The shortbread cookie compositions of this invention comprise confectioners' sugar and a fat component enriched with triglycerides bearing both long, saturated $C_{16}$ to $C_{22}$ fatty acid residues and a mixture of short $C_2$ to $C_4$ acid residues, a portion of which are propionic acid residues. Preferably, the long fatty acid residues are predominantly, i.e., at least about 75% and, in some embodiments at least about 90%, $C_{18}$, and the short acid residues are a mixture of $C_2$ and $C_3$, a mixture of $C_3$ and $C_4$, or a mixture of $C_2$ to $C_4$ acid residues.

Denoting the aliphatic portion of the long fatty acid substituent as L and the short as S, the shortbread compositions of this invention contain fats comprising a mixture of SSL, SLS, LLS, and LSL species described by the following formulae:

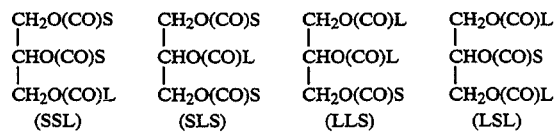

where
each L, independently, is a long chain saturated aliphatic group having between 15 and 21 carbons, derived from a fatty acid having 16 and 22 carbons; and each S, independently, is a short chain group having 1 to 3 carbons, derived from a mixture of acids having 2 to 3 carbons, a mixture of acids having 3 to 4 carbons, or a mixture of acids having 2 to 4 carbons.

Depending upon the preparative procedure, the triglyceride mixtures may also contain triglycerides of the formulae

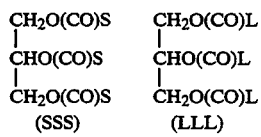

where S and L are as defined above.

However, preferred mixtures contain essentially no SSS and about 2% or less LLL.

Short acid residues have 2 to 4 carbons. Short residues are derived from carboxylic acids of the formula SCOOH, where S is a short chain aliphatic group having 1 to 3 carbons. Acylation of a glycerol hydroxyl by acid SCOOH results in the attachment of short chain S to the glycerol backbone by means of an ester linkage (—O—(CO)—). As used herein, the term "acid residue" refers to an acyl group comprising a short chain portion, here S, and a carbonyl group.

Short chain S may be straight or branched. Short chain S may be derived from any synthetic or natural organic acid including, but not limited to acetic (ethanoic), propionic (propanoic), butyric (butanoic), and the like acids. As used herein, chemical names include isomeric variations; for example, "butyric acid" includes normal-butyric acid (butanoic) and iso-butyric (2-methylpropanoic) acid, and so forth. The short chain groups are derived from mixtures that contain some propionic acid residues. Preferred acids are mixtures of acetic and propionic, mixtures of propionic and butyric acids, or mixtures of acetic, propionic, and butyric acids. In one preferred embodiment containing triglycerides bearing acetic, propionic and butyric acid short acid residues, at least about half of the short residues comprise a mixture of acetic and propionic acid; another has at least about 75% of the short residues comprising a mixture of acetic and propionic acid.

The long saturated pendant groups are derived from fatty acids of the formula LCOOH, where L is a saturated aliphatic group having 15 to 21 carbons. L groups may be derived from any synthetic or natural, straight or branched saturated organic acid including, but not limited to, palmitic (hexadecanoic), stearic (octadecanoic), arachidic (eicosanoic), behenic (docosanoic), and the like acids.

Unsaturated long groups may also be present in the mixtures. These are derived from unsaturated acids of the formula UCOOH, where U is e:t $C_{15}$ to $C_{19}$ unsaturated group, including, but not limited to, palmitoleic (9-hexadecenoic), oleic (cis-9-octadecenoic), elaidic (trans-9-octadecenoic), vaccenic (trans-11-octadecenoic), linoleic (cis, cis-9,12-octadecedienoic), linolenic (9,12,15-octadecatrinoic and 6,9,12-octadectrienoic), eleostearic (9,11,13-octadecatrienoic), arachidonic (5,8,11,14-eicosatetraenoic), and the like acids. L groups may be derived from hydrogenated U groups.

The various L and U groups can be derived from mixtures of fatty acids obtained from natural oils such as soybean, safflower, sunflower, sesame, peanut, corn, olive, rice bran, mustard seed, cottonseed, poppyseed, rapeseed, marine, meadowfoam and the like oils; fats such as babassu nut oil, palm oil, palm kernel oil, tallow, lard, shea butter, dairy butter; or plant waxes such as jojoba. Fat mixtures and/or fractions, crystallized fats, interesterified fats and mixtures of these may also be employed.

Mixtures of L groups are preferably derived from oils and fats that are hydrogenated, most preferably fully hydrogenated. Hydrogenated fats having at least about 70%, preferably at least about 75%, stearic acid residues such as, for example, hydrogenated peanut oil, hydrogenated olive oil, hydrogenated soybean oil, hydrogenated sesame oil, and hydrogenated corn oil are especially desirable for some embodiments. Other embodiments employ L moieties derived from hydrogenated fats having at least about 90% stearic acid residues, such as hydrogenated sunflower oil, hydrogenated safflower oil and hydrogenated canola. Preferred hydrogenated feedstocks are low in palmitic acid.

Component triglycerides making up the shortbread fats of this invention may be prepared using synthetic procedures known to those skilled in the art, such as, for example, directly esterifying glycerol or glycerol esters with fatty acids, fatty acid halides (notably chlorides) or fatty acid anhydrides, transesterifying glycerol with fatty acid esters, or interesterifying long and short chain triglycerides for such time and under such conditions that triglycerides bearing long and short residues form. Starting materials for triglyceride preparations may be obtained commercially or isolated from natural sources. Alternatively, component triglycerides may be isolated from natural or processed fats or oils, or fractions thereof.

Some desirable triglyceride mixtures are prepared using a random interesterification of triacetin, tripropionin and/or tributyrin with a substantially hydrogenated fat having at least about 70%, in some cases at least about 75%, and, in some embodiments, at least about 90%, stearic acid residues. For example, shortbread fats of this invention can be derived by the random interesterification of triacetin and tripropionin with hydrogenated canola or hydrogenated soybean oil, the random interesterification of tripropionin and tributyrin with hydrogenated canola or hydrogenated soybean oil, or the random interesterification of triacetin, tripropionin, and tributyrin with hydrogenated canola or hydrogenated soybean oil. Mixtures and fractions of triglycerides may also be employed, such as those derived by blending the products of different interesterification. Example preparations are illustrated hereafter.

Isolated or prepared triglycerides are purified using techniques known to, those skilled in the art. These include, but are not limited to, steam deodorization, fractional crystallization, distillation, chromatography, and the like. In some embodiments, shortbread fats of this invention are prepared by blending products purified by one means, e.g., steam deodorization, with fractions obtained in purifications using other means, e.g., fractional crystallization and/or distillation.

BEST MODES FOR CARRYING OUT THE INVENTION

In the practice of this invention, fats bearing a mixture of long, saturated $C_{16}$ to $C_{22}$ fatty acid residues as defined above and mixtures of short $C_2$ to $C_4$ acid residues a portion of which are propionic acid residues are incorporated in full or partial replacement of the fat component in shortbread compositions containing confectioners' sugar.

As used herein, "shortbread" includes any cookie or pastry containing a starch component, preferably flour; a sweetener comprising confectioners' sugar; and a fat component. Both larger, multiple-serving shortbread sheets that are cut or broken into pieces and single-serving smaller cookies are encompassed by this invention, as are pastries and pastry and confectionery components having the consistency, flavor and texture of shortbread.

The shortbread fat component contains the short-/long triglyceride described above, incorporated either alone, or in combination with another fat and/or fat mimetic, into the compositions. Other fats include butter, shortenings, natural triglycerides rich in highly desirable or essential fatty acids, such as oleic, linoleic, linolenic, or eicosapentaenoic acid, triglycerides bearing fatty acids having beneficial attributes such as those associated with conjugated linoleic acid isomers, medium chain triglycerides and the like. Other fat mimetics include any heretofore suggested as edible fat replacements, including, but not limited to, sugar esters, neoalkyl esters, polyglycerol esters, malonate esters, propoxylated glycerols, retrofats, carboxy/carboxylates, polyvinyl alcohol esters and the like.

When employed either alone or in products with other fats, short/long fats are added to the compositions in amounts effective to provide a cooling sensation when the baked shortbread is eaten. These are also desirably added in amounts effective to provide significant caloric reduction of the shortbread calories due to fat. At least a 25% or greater replacement would be effective for these purposes, and replacements of 50 to 100% are desired in many cases. Especially preferred shortbread compositions have a fat component comprised entirely of the triglycerides bearing short and long substituents.

The shortbread also has a starch component typically comprising a flour commonly used for pastry doughs such as all-purpose or unbleached wheat flour. Potato, rice, or other cereal flours such as cornstarch, oats and mixtures thereof can be used if variations from traditional shortbread are desired. Shortbread compositions typically also contains a flavoring, e.g., vanilla, and can also contain salt.

Shortbread compositions of the present invention further comprise confectioners' sugar, which can be the sole sweetener or be used in combination with one or more other natural/and or artificial sweeteners. Other natural sweeteners include granulated sugar, glucose, fructose, and maltose. Artificial sweeteners include 1-aspartyl-1-phenylalanine methyl ester (commercially available as aspartame or Nutri-Sweet TM), saccharine, cyclamate and the potassium salt of 6-methyl-3,4-dihydro-1,2,3-oxathiazin-4-one-2,2-dioxide (commercially available as acesulfame-K TM), or a mixture of these.

If an artificial sweetener is used in shortbread compositions, it is generally present in much smaller amounts due to the higher sweetening potency of most artificial sweeteners (which can be up to 50,000 times as sweet as sugar). In this case, at least 10% by weight of a bulking agent should preferably be included in the inventive composition in order to insure that the texture, form and other characteristics of a conventional shortbread are maintained. Typical bulking agents which are suitable for use in these instances should advantageously contribute no or little taste to the product and are preferably carbohydrates, which are most preferably at least partially nondigestible. Exemplary of such bulking agents are polydextrose, isomalt (commercially available as Palatinit TM), isomaltulose (commercially available as Palatinose), polyglucose, polymaltose, carboxymethyl-cellulose, microcrystalline cellulose, cellulose gel, arabinogalactan, as well as mixtures or combinations of any of these.

Although a reduction in calories is achieved by the use of the shortbread fats described above, the use of artificial sweeteners which have little or no caloric content as compared to natural sugars can serve as part of the sweetener component in some embodiments, further reducing the caloric content of the cookie compositions.

The shortbread may, optionally, contain other ingredients familiar to the skilled artisan such as spices, fruits and nuts, chocolate or other flavored bits, browning agents, mold, bacteria, and yeast inhibitors, and, optionally, leavening agents.

To achieve special finishes, shortbread formulated according to this invention may be washed with water, milk, egg (whole, yolk, or whites), butter, and the like, or mixtures thereof, before, during, and/or after baking using methodology known to the skilled artisan. Brushing the shortbread with butter prior to baking, for example, yields an especially flavorful product. Shortbread may also be dipped in chocolate or other coatings, and/or studded with nuts, candies, fruit or other flavored bits and the like.

For typical shortbread, the dough is formulated by creaming the fat and mixing it into the starch component, salt and other dry ingredients for a period of time sufficient to provide a uniform blend, and then optional flavorings and/or particulates are added. Sufficient aqueous components may, optionally, also be added under conditions effective to provide the consistency typically desired for shaping and forming conventional doughs, e.g., sufficient to make a dough that has a viscosity appropriate for shaping and holding surface impressions should these be desired to embellish the shortbread surface decoratively or provide scorings for breaking or cutting the cookie into pieces, but traditional recipes do not employ an aqueous component. Typically, the complete dough admixture will be blended for about three minutes in a suitable mixer. An exemplary formulation employs about 12% to 20% by weight sweetener (including confectioners' sugar), about 40% to 50% by weight flour, and about 20% to 40% by weight fat. Specific examples are illustrated hereafter.

On completion of the dough preparation, the dough is pressed into baking pans, or fed to suitable shortbread forming equipment wherein it is divided into suitably sized portions and then sheeted to the size required. Typical rotary molding or wire cut cookie equipment may be used. The baking pans can be of metal foil, such as aluminum foil, or they can be of ovenable ceramic, glass, paper or plastic materials.

The shortbread of this invention exhibit a number of desirable characteristics. The shortbread has a cooling effect and refreshing sensation when it is eaten, providing considerable gustatory satisfaction. The cooling effect can be modulated by varying either the amount of confectioners' sugar or the complexion of the fats bearing propionic acid and long, saturated residues, or both, to achieve desired sensorial impressions.

Another advantage of the invention is that desirable organoleptic characteristics can be achieved even in compositions that do not have a very pronounced cooling sensation on consumption. The shortenings of this invention that impart a cooling sensation can be employed to mask an ingredient such as xylitol which has a slight burning aftertaste, although this results in a final product having a less pronounced cooling sensation. Shortbread made using the shortenings of this invention is pleasant and melts in the mouth.

Another advantage of the invention is that preferred embodiments are low in calories, low in trans unsaturation, low in myristic and palmitic acid, and low in cholesterol, especially in comparison to traditional shortbread containing butter. Where short/long triglycerides containing butyric acid are employed in the fat component of the shortbread, a butter-like bouquet can be imparted to the food product. Because preferred embodiments contain little or no unsaturation, the shortbread of this invention is resistant to oxidation, and does not become rancid as quickly as ordinary shortbread.

Another advantage is that the height and spread of the final product can k,e controlled by judicious selection of short/long triglycerides in the fat component of the shortbread without deleterious effects on its baking properties or the moisture content of the final product.

EXAMPLES

The following examples are presented to further illustrate and explain the present invention and should not be taken as limiting in any regard. Unless otherwise indicated, all parts and percentages are by weight, and are based on the weight at the particular stage of the processing being described. Solid fat indices (herein abbreviated S.F.I.) are determined using dilatometry according to A.O.C.S. Method Cd 10-57 (1989), reporting solids at 50° F. (10° C.), 70° F. (21.1° C.), 80° F. (26.7° C.), 92° F. (33.3° C.), and 100° F. (37.8° C.). Solid iat contents (herein abbreviated S.F.C.) are determined using nuclear magnetic resonance (NMR) according to A.O.C.S. Method Cd 16-81 (1989). Mettler dropping points (M.D.P.) are determined using a Mettler Thermosystem FP 800 following A.O.C.S. Method Cc 18-80 (1989).

NMR data reported are proton NMR data. NMR S/L ratios are determined as the ratio of intensities of the methyl (—$CH_3$) resonances for the short and long fatty acid groups, respectively, obtained by dividing the integral areas attributable to S components by the areas attributable to the L, and have experimental errors of about 5 to 10%. In a typical NMR spectrum at 300 MegaHertz or higher, the long acid methyl resonance occurs farthest upfield, at ~0.9 ppm, as a triplet. The short acid methyl resonance is structure dependent and occurs at ~2.00 ppm (acetyl groups), ~1.15 ppm (propionyl groups) and ~0.95 ppm (butyryl groups).

Fat product analysis using supercritical fluid chromatography (S.C.C.), separating and quantifying the mixture components, generally employ a standard procedure. After filtering through a 0.45 micron filter, 0.1 ul of a 30 to 50 mg/ml sample is injected onto a 1×100 mm Deltabond Cyano ™ column from Keystone Scientific in a Suprex Model 200A S.C.C. having an S.C.C.-grade carbon dioxide mobile phase and an oven temperature of 125° C. A linear pressure gradient of 100 to 300 atmospheres is applied over a course of 20 minutes (i.e., 10 atm/min), followed by a hold at 300 atmospheres for 10 minutes. A flame ionization detector at 400° C. detects emerging mixture components run against an internal standard of methyl tetradecanoate (10 to 12 mg/mL) in methylene chloride. External standards of mono-, di-, and tristearin (~10 mg/mL each) are run under identical conditions. Using these peak areas, the peak areas of the sample are normalized, added together, and divided by the total to obtain percentages of LSS & SLS, LLS & LSL, and LLL in the short/long mixtures.

Moisture in shortbread products is determined using a Computrac ™ MA-5A ™ moisture analyzer, which measures moisture thermogravimetrically. The instrument automatically weighs and calculates the percent moisture at temperatures ranging from 75° C. to 165° C.; unless otherwise indicated, measurements herein are reported for 150° C.

Example 1

In this example, reduced calorie fat mixtures for use in shortbread cookies having a cooling sensation are prepared by interesterifying hydrogenated canola (refined, low erucic rapeseed oil containing 4% palmitic acid, hydrogenated at 180° C. and 60 lbs hydrogen until the Iodine Value (IV) is $\leq 3$) with triacetin and tripropionin.

Fat product A is prepared by randomly interesterifying 1 molar equivalent hydrogenated canola (899 g), 1 molar equivalent of triacetin, and 11 molar equivalents of tripropionin by heating the reactants in the presence of 0.2 to 0.3% sodium methoxide to ~110° C. with agitation under a vacuum for about half an hour until color develops. (The M.D.P. may be checked at this time, and the reaction continued if the M.D.P. has not dropped sufficiently.) Phosphoric acid (~0.2 to ~0.5%, at least twice the amount of sodium methoxide) is added to stop each reaction and neutralize the mixture, followed by the addition of 0.5% activated bleaching clay (Tonsil Optimum FF), 0.5% diatomaceous earth, and 1000 ppm citric acid (dissolved in water) to decolorize and remove soaps. The treatment is continued for ½ to 1 hour at 110° C. The products are cooled to 80° C., filtered, bleached, and steam deodorized at 210° C. for 2 to 3 hours.

Using this procedure, fat product A having a M.D.P. of 17.6° C. and an NMR S/L of 1.8 is obtained. The product has the following S.F.I.: 55% at 50° F., 32.3% at 70° F., 7.4% at 80° F., and 0% at 92° F. S.C.C. species analysis shows 82.3% SSL/SLS, 15.7% LLS/LSL, and 2.0% LLL. A fatty profile (using NMR) shows 7% acetic acid, 57% propionic acid, and 36% long acid residues in the product.

Another fat product is prepared using the same procedure as set out for A above, except that the interesterification mixture contains 6 moles triacetin, 6 moles tripropionin and 1 mole hydrogenated canola. Steam deodorization yields fat product B having a S.F.C. of 77.3% at 50° F., 64.2% at 70° F., 43.0% at 80° F., 1.0% at 92° F., and 1.0% at 100° F. A fatty acid (NMR) profile shows the product has 28% acetic acid, 34% propionic acid, and 38% long acid residues.

Fat product C is prepared using the same procedure as that set out for A above, except that 11 moles triacetin and 1 mole of tripropionin are employed as reactants with 1 mole hydrogenated canola. After steam deodorization, fat product C exhibits an S.F.I. of 64.4% at 50° F., 62.4% at 70° F., 58.7% at 80° F., 28.5% at 92° F., and 0.4% at 100° F. S.C.C. species analysis shows 83.7% SSL/SLS, 15.4% SLL/LSL, and 0.9% LLL.

The NMR fatty acid profile shows 51% acetic, 13% propionic, and 36% long acid residues.

Example 2

This example illustrates the preparation of other shortbread shortening fats of this invention like those illustrated in Example 1 above, except that they bear, as short acid residues, a mixture acetic, propionic and butyric acids.

One mole of hydrogenated canola is interesterified with 2.4 moles triacetin, 4.8 moles tripropionin, and 4.8 moles tributyrin and steam deodorized as described in Example 1 above. Fat product D so obtained has a M.D.P. of 26.8° C., and a S.F.I. of 63.3% at 50° F., 36.1% at 70° F., 1.0% at 80° F., and 0% at 92° F. A NMR fatty acid profile shows 13% acetic acid, 28% propionic acid, 26% butyric and 33% long acid residues.

Another fat product is prepared by interesterifying 0.7 moles triacetin, 1.4 moles tripropionin, 1.4 moles tributyrin, and 1 mole hydrogenated canola and then steam deodorizing. Fat product E so obtained has a M.D.P. of 31.3° C. and a S.F.I of 67.8% at 50° F., 56.5% at 70° F., 29.6% at 80° F., and 0% at 92° F. A NMR fatty acid profile shows 12% acetic, 25% propionic, 25% butyric and 39% long acid residues.

Example 3

This example compares and contrasts shortbread cookies containing fats prepared in Example 1 above, bearing acetic, propionic, and long acid residues obtained from hydrogenated canola, with shortbread cookies containing butter.

To make control cookies, 227 g (1 cup whipped, lightly salted) butter is creamed thoroughly before blending in ½ t vanilla extract (50 g). Confectioners sugar (80 g ∼½ cup, 6X) is gradually added and the mixture is creamed until it is light and fluffy. Then 2 cups flour (227 g) and ½ t salt (2.5 g) are added. Dough viscosity is measured using a Stevens-LFRA ™ texture analyzer. A spherical probe is plunged into dough of constant density (weight/volume. Using this method, the dough has a LFRA value of 213 at 74 ½° F.

The dough is rolled out, cut with a 4.5 cm round cutter, and baked at 375° F. for 15 minutes on ungreased sheets. The cookies are light golden in color with darker golden edges, smooth top surfaces with no surface cracks. The texture is short and tender. Cookie crumb is uniform with many small air pockets and fine layers. Minimal spread or leavening is observable, and cookie edges are square. Top diameter is 56.4 mm, bottom diameter is 59.9 mm, height is 9.3 mm, and moisture is 2.06%. The cookies do not have a cooling melt-away sensation when consumed.

Shortbread cookies containing the fat product A of Example 1 in full replacement of the butter are then prepared using the same procedure. The fat/sugar mixture incorporates air and becomes light, but does not get fluffy like butter. The dough has a LFRA value of 36 at 78 ½° F. After refrigeration, then remixing, the dough has a LFRA of 229 at 76°–77 ½° F. Baked cookies are uniform and light golden and have a coarse porous particulate-like and slightly glossy surface. The texture is very delicate, tender and short. Cookie crumb is open with larger air pockets and thicker layering than the butter controls. A moderate initial cooling sensation is perceived upon eating. The cookies spread more than the control, with a bottom diameter of 75.0 mm, a rounded top diameter, a height of 6.5 mm, and moisture of 3.5%.

A second type shortbread cookie is prepared using the fat product B of Example 1 in full replacement of the butter in the control recipe. The fat/sugar mixture creams light and fluffy, but clumps of fat remain in the cream. Additional water (65 g) is added to make a workable dough with a LFRA value comparable to the butter control (208 at 83 ½° F.). Baked cookies are light golden in color with darker golden edges and smooth surfaces without cracks. The texture is short, but softer and slightly tougher than the butter control. Cookie crumb is open with larger air pockets and thicker layering than the control. A moderate initial cooling sensation is perceived upon eating. The cookies spread less than the control, having a top diameter of 52.8 mm, a bottom diameter of 61.8 mm, and a height of 9.8 mm. The cookies are moister than the control, exhibiting 5.81%.

A third type of shortbread cookie is prepared using fat product C of Example 1 in full replacement of the butter using the same recipe. Too stiff to cream, the fat is melted before creaming light and fluffy, leaving small clumps of fat. Additional water (87 g) is needed to form a workable dough having a LFRA of 408 at 86 ½° F. Cookies baked for 19 minutes are light golden, with slightly darker bottom edges and top surfaces that have a smooth, slightly glossy and gently rolling surface with no surface cracks. The texture is soft and slightly chewy. Cookie crumb is similar to that observed with fat product B: open with larger air pockets and thicker layering than the butter control. A slight to moderate initial cooling sensation is perceived upon eating. The cookies spread less than the control, having a top diameter of 37.8 mm, a bottom diameter of 44.4 mm, and a height of 17.4 mm. The cookies are moister than any of those previously described, 6.0%.

Example 4

This example compares and contrasts shortbread cookies containing fats prepared in Example 2 above, bearing acetic, propionic, butyric and long acid residues obtained from hydrogenated canola, with shortbread cookies containing butter.

Control butter shortbread cookies are first prepared. Refrigerated butter (227 g) is creamed thoroughly and then blended with vanilla (2 g). Confectioners sugar (10 X, 80 g) is gradually added and the mixture creamed to make a light, fluffy blend, to which flour (300 g) and salt (2.5 g) are added. The dough has a LFRA of 281 at 69.7° F.

The dough is rolled out to a 1 cm thickness, cut using 6.0 cm round cutters (26–31 g pieces), pricked with fork tines, and baked at 375° F. on ungreased cookie sheets in a rotating reel oven. The baked cookies have the same appearance as the controls of Example 3 above: light golden in color with slightly darker edges, having surfaces that are smooth with no surface cracks. The texture is short and tender. Crumb is uniform with many small air pockets and fine layers. Minimal spread or leavening is observable, and the cookies have square edges. The top diameter is 70.0 mm, the bottom diameter is 72.5 mm, the height is 9.7 mm, and the moisture is 4.12%.

A shortbread cookie employing fat product D of Example 2 in full replacement of the butter is then prepared. The fat sugar mixture creams light (but not fluffy) to the consistency of a loose jelly. The dough LFRA is 31 at 75.2° F.; after refrigeration, the LFRA is 819 at 72.2° F. Baked cookies have a uniform, light golden color, with surfaces that are coarse, porous and have large surface cracks. The texture is tender but harder than the control. The top surface layer is softer and appears wet. A moderate cooling sensation is perceived upon eating. Cookie crumb is open with larger air pockets and thicker layering than the butter control. The cookies spread and have rounded edges; the bottom diameter is 83.8 mm and the height is 7.9 mm. Moisture is less than the control, 2.31%.

Other shortbread cookies are prepared by replacing the butter in the control recipe with fat product E of Example 2. The fat creams light and fluffy much like the butter control at about 79 to 80.5° F. At 80.9° F., the dough exhibits a LFRA of 263. The dough handles well at about 80.5°, but, as soon as it cools a few degrees, it firms and becomes brittle and more difficult to handle. Baked cookies have a uniform golden color and a smooth surface with small surface cracks. Texture, crumb, and the top surface layer are similar to cookies made with fat product D described above. A moderate cooling sensation is perceived upon eating. Though the cookies have rounded edges, spread is less than product D cookies, exhibiting a bottom diameter of 76.6 mm and a height of 10.1 mm. Moisture is 2.46%.

Example 5

Like Example 3, this example illustrates the preparation of shortbread cookies having a fat component comprising triglycerides bearing acetic, propionic, and long chain acids derived from hydrogenated canola. The fats, however, are blends, and comparisons are made to the butter control cookies of Example 4. Texture and crumb are modified with dough additives.

Shortbread cookie dough is formulated as described in Example 4 above, except that a 30/70 blend of fat product B and fat product A of Example 1 is used as a total replacement of the butter. Melted fat creams light and fluffy, without clumping, at about 78.5° F. The dough exhibits a LFRA of 205 at ~78.5° F., handles well but becomes firmer and more brittle as it cools. Baked cookies have a uniform golden color and a smooth top surface with small surface cracks; the top surface layer is softer and similar to cookies made with fat product E. Texture is tender and short but harder than the butter control. Cookie crumb is open with larger air pockets and thicker layering than the control. A moderate initial cooling sensation is observed upon eating. Cookies edges are rounded; bottom diameter is 72.8 mm and height is 10.3 mm. Moisture is 2.18%.

The rolling and cutting of the dough containing the 30/70 blend at a slightly warmer temperature improves the appearance of the baked cookies. At 79.4° F., the dough has a LFRA of 144. Dough handling improves. After baking, diameter (bottom, 73.9 mm), height (10.3 mm), texture, crumb, and cooling sensation remain essentially the same, but the top surface is smoother and more rounded, with smaller surface cracks. Moisture is 2.68%.

The texture and crumb of shortbread cookies containing the 30/70 blend of products B and A are modified by substituting Fibrim ™ soy fiber for 20% of the flour. At 79.6° F., the dough exhibits a LFRA of 99. The dough rolls and cuts clean. Baked cookies are uniform and golden, with a smooth top surface having fine surface cracks. Texture is shorter and softer than cookies having no fiber. A moderate initial cooling sensation is observed upon eating. Crumb is more uniform with small air pockets than other cookies heretofore described in the examples. The edges are rounded, and cookies exhibit slight increases in diameter (bottom is 74.0 mm) and height (11.0 mm). Moisture is 2.25%.

Though a 70/30 fat blend of products B and A creamed light and fluffy, with some clumps in the cream, a dough formed from this blend is too dry and too crumbly to roll.

Example 6

This example compares and contrasts shortbread cookies containing an all-purpose vegetable shortening with cookies containing the fats of this invention and a butter control.

Using the procedure outlined in Example 4 above, the shortening creams light and fluffy to make a dough too soft and tacky to roll out. After refrigeration, the dough softens too quickly to cut, so cookies are formed by hand. At 71.5° F., 27 g of dough have a LFRA of 130. Baked cookies are whiter in color, have smooth surfaces with small surface cracks, and rounded edges like cookies prepared with the 30/70 blend of fat products B and A (with or without fiber). A very slight cooling sensation is perceived on eating.

Cookies have slightly more spread (bottom diameter is 76 mm) and height (10.4 mm) than the butter control of Example 4, and have slightly sunken centers. The top surface layer is softer, and has a wetter appearance than any cookie described in Examples 3 to 5. Texture is very soft, light and tender. Cookie crumb is more open and porous than the butter control, closer in appearance to the cookies of this invention described in Examples 3 to 5 above. Moisture is 2.34%.

Example 7

This example reports the preparation of shortbread cookies using different types of sugars, illustrating the effect of sugars on cookie spread, height, texture, appearance and crumb.

A cookie dough is prepared using the 30/70 products B and A blend as set out in Example 5 above, except that 80 g fine granulated sugar is employed in place of confectioner's sugar. Sugar granules are visible and can be felt in the dough. At 78.8° F., the dough has a LFRA of 139. On baking, cookies have a glossy/waxy appearance with a coarse porous surface. The cookies are very delicate and fall apart if handled. Texture is grainy, and there is no cookie crumb structure. Only slight to moderate cooling sensation is perceived upon eating. The cookies spread excessively, exhibiting diameters of at least 102 mm and heights about 3.8 mm. Moisture is 1.03%.

A butter control dough using granulated sugar also feels grainy, and sugar crystals are visible. The dough becomes soft quickly, sticky and hard to roll out. At 69.7° F., the dough has a LFRA of 292. Baked cookies, which are light golden with darker edges that are more rounded than shortbread made with confectioners sugar, exhibit a top diameter of 68.4 mm, a bottom diameter of 69.4 mm and a height of 10.9 mm. The texture is grainier, with very slightly more open crumb. No cooling sensation is perceived.

Example 8

This example compares control shortbread cookies prepared with all-purpose vegetable shortening as the fat component and experimental cookies prepared with triglycerides bearing butyric acid residues and long, saturated residues derived from hydrogenated soybean oil.

The fat for the experimental cookies is first prepared. Hydrogenated soybean oil is randomly interesterified with 2.5 moles of tributyrin and steam deodorized as described in Example 1 above to obtain a product having a M.D.P. of 33.2° C. and an S.F.I. of 66.8% at 50° F., 36.9% at 70° F., 12.2% at 80° F., 7.7% at 92° F. and 6.9% at 100° F. is obtained. S.C.C. species analysis shows 69.9% SSL/SLS, 28.0% LLS/LSL, and 2.1% LLL.

Cookie doughs are formulated using flour, fat, confectioner's sugar, salt, and vanilla as described in Example 4 above. Dough containing the experimental fat is much firmer than the control dough. The control dough is difficult to roll out and cut, whereas the experimental dough, if rolled out immediately after mixing, rolls out and cuts well.

Both control and experimental cookies have smooth surfaces and rounded edges. The top ~50% of the control cookies have a soft and light texture whereas the bottom ~50% have a hard, crunchy texture. The top ~25~35% of the experimental cookies have softer, lighter textures than the bottom ~65–75% of the cookies. The control cookies have sunken centers, whereas the experimental cookies have flat or slightly raised centers. Cookie spread and height are slightly greater for the control. The texture of the control is softer and more tender and light than the experimental cookies which are tender but harder. Both control and experimental cookies exhibit little or no perceptible cooling sensation when eaten.

The above description is for the purpose of teaching the person of ordinary skill in the art how to practice the present invention, and it is not intended to detail all those obvious modifications and variations of it which will become apparent to the skilled worker upon reading the description. It is intended, however, that all such obvious modifications and variations be included within the scope of the present invention, which is defined by the following claims.

I claim:

1. A shortbread composition comprising
   (a) a starch component;
   (b) a sweetener comprising confectioners' sugar; and
   (c) a fat component comprising triglycerides bearing both long $C_{16}$ to $C_{22}$ saturated fatty acid residues and a mixture of $C_2$ to $C_3$ short acid residues, a portion of which are propionic acid residues, added in amounts sufficient to impart a cooling sensation upon consumption.

2. A composition according to claim 1 wherein at least about 70% of the long $C_{16}$ to $C_{22}$ saturated fatty acid residues are stearic acid residues and the short acid residues are selected from the group consisting of $C_2$ to $C_3$ acid residues and $C_2$ to $C_4$ acid residues.

3. A composition according to claim 2 wherein the long acid residues are derived from hydrogenated oils having at least about 90% stearic acid residues.

4. A composition according to claim 3 wherein the long acid residues are derived from hydrogenated oils selected from the group consisting of hydrogenated soybean oil and hydrogenated canola.

5. A composition according to claim 1 wherein the long fatty acids are derived from hydrogenated oils having at least about 75% stearic acid residues.

6. A composition according to claim 5 wherein the short acid residues are derived from a mixture of acetic acid and propionic acid residues.

7. A composition according to claim 5 wherein the short acid residues are derived from a mixture of acetic acid, propionic acid, and butyric acid residues.

8. A composition according to claim 7 wherein at least about half of the short acid residues comprise a mixture of acetic and propionic acid residues.

9. A composition according to claim 8 wherein at least about 75% of the short acid residues comprise a mixture of acetic and propionic acid residues.

10. In a shortbread composition comprising flour, sugar and a shortening component, an improvement wherein said sugar comprises confectioner's sugar and at least a portion of said shortening component is replaced by triglycerides both bearing long, saturated fatty acid residues derived from fatty acids having between 16 and 22 carbons, and short acid residues derived from acids selected from the group consisting of mixtures of acetic and propionic acid, mixtures of propionic and butyric acid, and mixtures of acetic, propionic, and butyric acid, in amounts sufficient to produce a product which imparts a cooling sensation upon consumption.

11. An improvement according to claim 10 wherein the long fatty acids are derived from hydrogenated oils having at least about 75% stearic acid residues.

12. An improvement according to claim 11 wherein the short acid residues are derived from mixtures of acetic and propionic acid.

13. An improvement according to claim 11 wherein the short acid residues are derived from mixtures of acetic, propionic, and butyric acid.

14. An improvement according to claim 10 wherein said sugar is confectioner's sugar and said shortening component consists essentially of said triglycerides.

15. A method for imparting, upon consumption, a perceptible cooling sensation to shortbread comprising sugar and a fat component which comprises replacing at least a portion of the sugar with confectioner's sugar and at least a portion of the fat component with triglycerides bearing long, saturated fatty acid residues derived from fatty acids having between 16 and 22 carbons, and short acid residues derived from acids selected from the group consisting of mixtures of acetic and propionic acid, mixtures of propionic and butyric acid, and mixtures of acetic, propionic, and butyric acid.

16. A method according to claim 15 wherein at least 70% of the long fatty acid residues are derived from stearic acid, and the short acid residues are derived from mixtures of acetic and propionic acid or mixtures of acetic, propionic, and butyric acid.

17. A method according to claim 16 wherein the long fatty acid residues are derived from hydrogenated oils having at least about 75% stearic acid residues.

18. A method according to claim 15 wherein all the sugar is replaced with confectioner's sugar and all the fat component is replaced with the triglycerides bearing long and short acid residues.

19. A method according to claim 15 wherein said perceptible cooling sensation is imparted without adding dextrose, polyols or mint oils to the composition.

20. Shortbread cookies made according to the method of claim 15.

* * * * *